(12) United States Patent
Lemcoff et al.

(10) Patent No.: US 6,460,352 B1
(45) Date of Patent: Oct. 8, 2002

(54) ATMOSPHERE CONTROL FOR PERISHABLE PRODUCE

(75) Inventors: Norberto Lemcoff, Livingston; Shuguang Deng, Somerville, both of NJ (US); Michael Ernest Garrett, Woking (GB); Michael John Heywood, Hythe (GB); Ralph John Whiteman, New Barnet (GB)

(73) Assignee: The BOC Group, plc, Windlesham (GB)

( * ) Notice: Subject to any disclaimer, the term of this patent is extended or adjusted under 35 U.S.C. 154(b) by 0 days.

(21) Appl. No.: 09/691,789

(22) Filed: Oct. 19, 2000

(30) Foreign Application Priority Data

Oct. 20, 2000 (GB) .............................................. 9924866

(51) Int. Cl.[7] .................................................. F24F 3/16
(52) U.S. Cl. ................................. 62/78; 62/127; 62/179
(58) Field of Search ............................. 62/78, 127, 179

(56) References Cited

U.S. PATENT DOCUMENTS 4,829,774  5/1989  Wassibauer et al.
5,515,693  * 5/1996  Cahill-O'Brien et al. ...... 62/78

FOREIGN PATENT DOCUMENTS

| DE | 219 377 A1 | 3/1985 |
|----|------------|--------|
| EP | 63229118   | 2/1987 |
| EP | 02084132   | 3/1990 |
| EP | 0 467 668 A1 | 1/1992 |
| EP | 0 565 291 A1 | 10/1993 |
| EP | 07236348   | 2/1994 |
| EP | 0 750 852 A2 | 1/1997 |

* cited by examiner

Primary Examiner—Ronald Capossela
(74) Attorney, Agent, or Firm—Joshua L. Cohen; Salvatore P. Pace (57) ABSTRACT

Apparatus and method for controlling the composition of the atmosphere within a refrigerated container during the storage and/or transportation of perishable and/or respiring produce in which carbon dioxide and ethylene (and other evolved hydrocarbons) are removed from the container atmosphere by adsorption, the adsorptive materials being regenerated with ambient air.

19 Claims, 6 Drawing Sheets

ATMOSPHERE CONTROL FOR PERISHABLE PRODUCE

FIELD OF THE INVENTION

This invention relates to methods and apparatus for controlling the composition of the atmosphere within a container, in particular refrigerated containers during the storage and/or transportation of produce which is perishable and which may respire, such as fruit, vegetables and flowers. (The word "container" as used herein includes not only individual refrigerated containers such as standard ISO transportable containers but also enclosed stores, parts of warehouses, ships holds and the like).

BACKGROUND OF THE INVENTION

It is known that such perishable and/or respiring produce may be carried in refrigerated containers, and refrigeration units have been developed for use with such containers, which units are reliable and function efficiently for long periods of time.

It is also known that perishable and/or respiring produce is affected by the surrounding atmosphere, and that, by modifying the composition of the atmosphere surrounding the produce, its preservation in storage or during transportation can be enhanced. Specific atmospheric components which are usually considered are hydrocarbons, carbon dioxide, oxygen and water vapour. Hydrocarbons are evolved by some types of fruit and vegetable, and these can promote rapid ripening and are therefore undesirable in storage/transportation atmospheres; the principal hydrocarbon is ethylene ($C_2H_4$), and hereinafter and in the accompanying claims the use of the word "ethylene" should be considered to embrace all hydrocarbons, whether evolved by respiring produce or present in ambient air. Carbon dioxide is also produced by respiring products, and is known to have either an adverse or a favourable effect on the preservation of such products. Oxygen and water vapour are also known to affect the preservation of many perishable products, and generally a lower than atmospheric level of oxygen is useful for preserving perishable products.

A problem in controlling the atmosphere surrounding perishable and/or respiring produce in a refrigerated container is that the atmospheric requirements for optimum preservation vary between different kinds of fruit and vegetable. Also, different fruits and vegetables respire at different rates and evolve differing amounts of carbon dioxide, ethylene and/or water vapour. For example, whilst most fruits and vegetables require a carbon dioxide level of about 5% (for example apples and pears about 1% to 3%, cabbage about 3% to 6%), some need a significantly higher level, such as raspberries and strawberries which generally need 15% to 20% carbon dioxide. Similarly, optimum oxygen levels can vary between 2% to 3% (for examples olives, apricots and broccoli) and 5% to 10% (for example figs, lemons and peppers). High respiring products, such as apples and pears can rapidly reduce oxygen levels in a closed container below the levels required for optimum preservation. Relatively high levels of relative humidity are preferred for the preservation of most perishable products; however excessive levels of relative humidity are undesirable as they can promote rotting—although in practice overly high levels of relative humidity are unlikely to occur in the refrigerated atmosphere within a refrigerated container. On the other hand, unduly low levels of relative humidity are usually harmful as they promote dehydration of the produce, which can adversely affect both weight and quality. Accordingly, there is a need for a system to control the atmosphere within a refrigerated container and which is capable of adapting easily to the differing atmospheric requirements of different products, whilst being efficient, effective and relatively simple and inexpensive to manufacture and operate.

SUMMARY OF THE INVENTION

In accordance with one aspect of the invention, there is provided a method of modifying the composition of the atmosphere within a container during the refrigerated storage and/or transportation of perishable and/or respiring produce therein, comprising the following steps:

a) withdrawing and pressurising a portion of said refrigerated atmosphere;

b) adsorbing water vapour from said pressurised atmosphere by passing it concurrently through a layer of an adsorbent which preferentially adsorbs water vapour from said atmosphere;

c) adsorbing carbon dioxide from the water vapour—depleted atmosphere by passing it concurrently through a layer of an adsorbent which preferentially adsorbs carbon dioxide from the atmosphere;

d) adsorbing ethylene from the water vapour and carbon dioxide-depleted atmosphere by passing it concurrently through a layer of an adsorbent which preferentially adsorbs ethylene from the atmosphere;

e) returning the water vapour, carbon dioxide- and ethylene-depleted atmosphere to the container, and f) regenerating the adsorbent layers by passing ambient air therethrough in a countercurrent direction and thereafter venting said air to ambient atmosphere, wherein water vapour is adsorbed from said ambient air by passing it through a layer of an adsorbent which preferentially adsorbs water vapour from said air before it passes through said ethylene and said carbon dioxide adsorbent layers.

The method is preferably carried out with the above steps being conducted in the order stated.

Such a method (in which the adsorption/desorption processes are preferably carried out on a pressure-swing basis, although those skilled in the art will appreciate how they could be effected on a temperature-swing basis, both pressure-swing and temperature-swing modes of operation being well documented in the art of separating air or gas mixtures into their component parts) is advantageous because it enables the minimum number of separate adsorption processes and/or the minimum size of adsorption apparatus to be used for effective atmosphere control, which (because most adsorption processes do not effect a total separation of each component from the atmosphere) minimises the loss of atmosphere components which are needed to be returned to the container. The method is therefore very efficient. In addition, because it is possible to minimise the number of adsorption processes, it is possible to provide a system which is sufficiently compact to fit within the confines of a standard container but without occupying too much of the available storage space. In particular, the initial adsorption of water vapour and carbon dioxide (in steps b) and c)) can be effected in a single layer of adsorbent material. Additionally or alternatively, all the adsorption steps can be effected in a single adsorption vessel, containing several layers of adsorbent.

Because the ambient air will nearly always contain significantly more water vapour than the refrigerated atmosphere within the container, it is necessary to dry the air for regenerating the adsorbent layers before it reaches the carbon dioxide adsorbent layer (so as to protect the adsorbent material therein) and, optimally, before it reaches the ethylene adsorbent layer; contamination of these layers with water would be likely to degrade their adsorption characteristics to an unacceptable and even irremediable extent.

As part of the process of regenerating the adsorbent layers, the adsorption vessel may be vented to atmosphere prior to the regeneration step (i.e. between steps e) and f)).

During the removal of carbon dioxide, particularly from the atmosphere withdrawn from a container holding produce with a high respiration rate, a partial vacuum is created within the container. Because in practice it is not feasible to make standard containers completely sealed to the ambient air, this vacuum draws ambient air into the container, significantly raising at least the oxygen level within the container and so adversely affecting the preservation of the produce.

Consequently, the method may further comprise pressurising ambient air and depleting it of water vapour, oxygen, carbon dioxide and ethylene by adsorption thereof, cyclically with steps a) to f), and passing the resulting nitrogen-rich atmosphere into the container.

As can be appreciated, cycling the injection of nitrogen-rich atmosphere into the container with the successive adsorption steps to scrub the container atmosphere of carbon dioxide, oxygen and ethylene, enables a single compressor to be utilised. The compressor used for the adsorption processes can also be used, cyclically, to drive the adsorption process producing the nitrogen-rich atmosphere from ambient air. Injection of the nitrogen-rich atmosphere into the container is advantageously carried out until the pressure within the container is somewhat above ambient. The resulting over pressure, whilst tending to leak to the ambient atmosphere surrounding the container, will prevent ambient air from entering the container and affecting the composition of the atmosphere therein.

To produce the nitrogen-rich atmosphere, ambient air is preferably compressed and passed through a bed containing at least a layer of alumina, a layer of activated carbon and a layer of carbon molecular sieve. Water vapour, oxygen, carbon dioxide and ethylene, as well as other contaminants in the ambient air, are adsorbed and the resulting nitrogen-rich mixture injected into the container. The nitrogen generation system can operate as a conventional two bed system, involving production, equalisation and regeneration steps as is known in the art (the nitrogen-producing unit being regenerated by venting and then purging with nitrogen-rich product gas), or as a single bed system. In the latter case, a nitrogen receiver or buffer vessel will be required for storing nitrogen-rich gas for use in regenerating the bed; the advantage of a single step system is that the number of valves in the system is minimised.

Advantageously, the nitrogen generator, whether a single or two bed system, can be arranged so as to feed not directly into the container but rather into the adsorption vessel for adsorbing carbon dioxide and/or ethylene prior to the introduction of the nitrogen into the container. With such an arrangement, the nitrogen-rich atmosphere can be stripped of any carbon dioxide and/or ethylene so as to ensure no unintentional and undesirable addition of these components to the container atmosphere.

In order to control the atmosphere within the container, the method may further comprise sensing the levels of carbon dioxide, pressure and oxygen within the container, comparing the sensed levels with predetermined levels, the predetermined levels of carbon dioxide and oxygen being determined by the nature of the produce within the container, and initiating and controlling the steps a) to f), the passing of nitrogen-rich atmosphere into the container, the injection of carbon dioxide into the container, and/or the venting of the container to ambient atmosphere until the sensed levels are substantially equal to the predetermined levels. As will be described further below, this facilitates the provision of a single and reliable control system to modify the atmosphere within the container to any of a wide range of atmosphere compositions, according to the nature of the produce carried in the container, the system responding to a primary carbon dioxide level signal, and to subsidiary pressure and oxygen level signals. In practical embodiments of the invention, it is envisaged that the predetermined level of carbon dioxide would vary between 0 and 12% (with a tolerance of about 50%, but preferably no more than about 20%) and the predetermined level of oxygen would vary between 2 and 21% (with a similar tolerance), according to the requirements of different products. The predetermined pressure level would be above ambient, in order to prevent the ingress of ambient air, but an amount determined by such variable factors as the container leak rate, the cycle rate of the nitrogen injection, and so on. In practice, a predetermined pressure level of approximately 2 inches water gauge (500 Pa) would usually be sufficient.

The method may further comprise sensing the level of relative humidity within the container, comparing the sensed relative humidity with a relative humidity level determined according to the nature of the produce within the container and, when the sensed level is less than the predetermined level, initiating and controlling the injection of atomised water into the container until the sensed level is substantially equal to the predetermined level. As previously noted, overly and undesirably high levels of humidity are unlikely to be encountered in practice and it is therefore only necessary to protect against low relative humidity.

In accordance with another aspect of the invention, the invention provides apparatus for modifying the composition of the atmosphere within a refrigerated container during the storage and/or transportation of respiring produce therein, the apparatus comprising means for withdrawing and pressurising a portion of the atmosphere and for introducing the pressurised atmosphere into at least one adsorption vessel for passage therethrough in a concurrent direction, the or each adsorption vessel containing several layers of adsorbent material, successive layers in the concurrent direction being adapted for the preferential adsorption of water vapour, carbon dioxide and ethylene, means being provided for returning the water vapour, carbon dioxide and ethylene-depleted atmosphere to the container, and means being provided for passing pressurised ambient air through the layers of adsorbent material in the adsorption vessel in a countercurrent direction, a further layer of adsorbent material which preferentially adsorbs waters vapour being provided directly adjacent the layer of adsorption material which preferentially adsorbs ethylene.

A single layer of an adsorbent material which preferentially adsorbs both water vapour and carbon dioxide may be provided, and located directly adjacent the layer of adsorbent material which preferentially adsorbs ethylene.

Alternatively, the further layer of adsorbent material is interposed between and directly adjacent the layers of adsorption material which preferentially adsorb carbon dioxide and ethylene.

The separate layers of adsorbent material in the or each adsorption vessel are preferably held packed contiguously by compression means. In the case where the adsorption vessel is cylindrical, the compression means comprises a sprung circular plate which presses the adsorbent materials tightly together within the cylinder. The advantage of such an arrangement is that it enables the adsorption vessel to be disposed in any orientation within the container—vertically, horizontally or upside-down—without upsetting the layers of adsorbent material, so that the adsorption processes are unaffected.

Means may be provided for injecting carbon dioxide into the container, to modify the atmosphere therein when the carbon dioxide level is too low.

BRIEF DESCRIPTION OF THE DRAWINGS

For a better understanding of the invention, reference will now be made, by way of exemplification only, to the accompanying drawings, in which.

DETAILED DESCRIPTION OF THE INVENTION

With reference to the drawings, the apparatus shown in FIG. 1 includes an adsorption vessel 1 (described in more detail below), a compressor 3 and three, three-way valves 5, 7, 9. The adsorption vessel 1 is provided with a conventional pressure relief valve 11.

In operation, when a refrigerated container 13 holds perishable and/or respiring produce, the atmosphere within the container 13 is controlled as follows. Firstly, the adsorption vessel 1 is pressurised; atmosphere is drawn from the container 13 along a pipe 15 to the valve 5 and along a pipe 17 by the compressor 3, which then pressurises this atmosphere and passes it to the valve 7 and, via the pipe 19, to the adsorption vessel 1. The valve 11 is closed so that the adsorption vessel 1 is pressurised above ambient. In practice, this pressurisation step takes approximately 10 seconds.

In the next stage, atmosphere continues to be drawn by the compressor 3 from the container 13 along the pipe 15, through the valves 5 and 7 and, under pressure, through the pipes 17 and 19 and in to the adsorption vessel 1. As the pressurised atmosphere passes through the layers of adsorbent material in the vessel 1 water vapour, carbon dioxide and ethylene is adsorbed and the resulting atmosphere returned to the container 13 via a pipe 21, the valve 9 and a pipe 23. In practice, this "production" step lasts for between about 290 and 800 seconds.

When the adsorbent capacity of one or all of the layers of adsorbent material in the adsorption vessel 1 has been reached, the "production" step must end. At this point, the adsorption vessel 1 is vented via the pipe 19 and the valve 7 (the other valves being closed) along a pipe 25 to atmosphere, a step which lasts for about 10 seconds.

The adsorbent materials within the adsorption vessel 1 are now regenerated in a purge step, in which ambient air is drawn in through a pipe 27 and the valve 5 and along the pipe 17 by the compressor 3. The valve 7 is closed, and therefore the ambient air passes along a pipe 29 to the valve 9, and along the pipe 21 to the vessel 1. The arrangement of the outlet ends of the pipes 19 and 21 within the vessel 1 is shown in more detail in FIGS. 3a and 3b. However, the arrangement is such that the pressurised ambient air flows through the adsorption vessel 1 in a countercurrent direction, compared to the flows therein during the "production" step. The flow of ambient air, after passing through the adsorption vessel 1 in the countercurrent direction, flows through the pipe 19, the valve 7 and the pipe 25 to be vented to atmosphere. During this purge step, which typically lasts about 170 seconds, the water vapour, carbon dioxide and ethylene adsorbed by the adsorbent materials is desorbed by the pressurised ambient air, until the layers of adsorbent material within the adsorption vessel 1 are ready to begin another production cycle.

It is known that during the "production" step, particularly when the container 13 holds produce having a high respiration rate, a vacuum is generated in the container 13. Because such containers are not, in practice, sealed against leaks, ambient air would tend to leak into the container 13, increase the oxygen level in the atmosphere inside the container, and adversely affect the conservation of the produce.

Accordingly a nitrogen generation system is also provided (not shown) which may be driven by the compressor 3—cyclically with the above-described steps—and nitrogen-rich gas is injected into the container 13 to super ambient pressure, thereby preventing ingress of ambient air and helping preserve the produce within the container 13. The nitrogen generation system can be of the well-known two adsorbent bed type, involving production, equalisation and regeneration steps as is known in the art, or it can be a conventional single adsorbent bed system, in which case a nitrogen-rich produce gas receiver, or buffer vessel, is needed to store product gas for regenerating the single bed. In either case, the regeneration of the nitrogen generating system is carried out in the conventional manner, and not in any connection with the system shown in FIG. 1.

Figure 1:
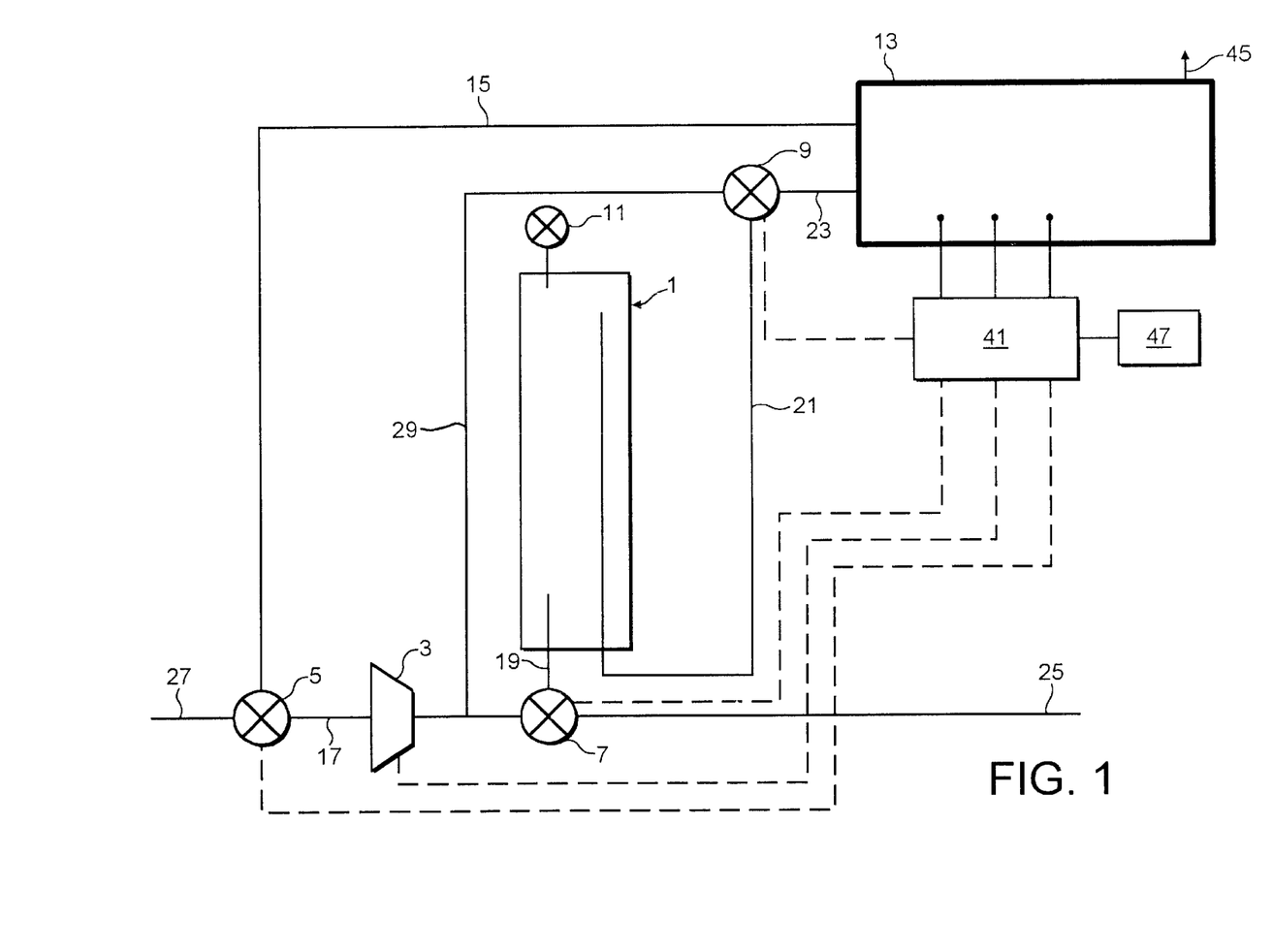
FIG. 1 is a schematic view of an apparatus in accordance with the invention.

As the system illustrated in FIG. 1 is generally effective only to reduce the levels of carbon dioxide in particular in the atmosphere within the container 13, when produce which requires a minimum acceptable level of carbon dioxide is carried in the container, means (not shown) may be provided to inject carbon dioxide directly into the container. This may suitably comprise a cylinder of pressurised carbon dioxide, and an injection nozzle within the container 13.

Control of the operation of the system is by means of a suitably programmed electronic controller 41, such as a microprocessor, which reports to signals from sensors 43a, b, c within the container adapted to sense the levels of carbon dioxide, pressure and oxygen, respectively, in the atmosphere within the container 13. The controller 41 then actuates the valves 5, 7, 9 and the compressor 3 according to the atmosphere requirements of the produce within the container 13 (which requirements are pre-programmed into the controller 41 by way of operator input panel 47); this control is illustrated by the broken lines in FIG. 1.

Figure 2A:
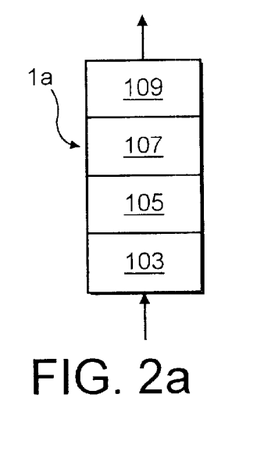
FIGS. 2a and 2b are schematic views of alternative embodiments of the adsorption vessel in FIG. 1, having 4 and 3 layers of adsorbent material, respectively.
Figure 2B:
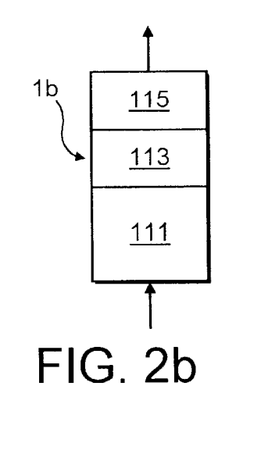

Referring now to FIGS. 2a and 2b, these show alternative arrangements of adsorbent layers within the adsorbent vessel (here denoted 1a, 1b, respectively), it being understood that flow through the vessels 1a, 1b in the concurrent direction is shown by the arrows. Vessel 1a contains 4 adsorbent layers; in the concurrent direction: a layer 103 of an adsorbent which adsorbs water vapour, such as alumina; a layer 105 of material which adsorbs carbon dioxide, such as a zeolite; a further layer 107 of a material which adsorbs ethylene, such as a metal substituted zeolite (which may, in practice, be mixed with a cheaper diluent material), and a layer 109 of an adsorbent material which adsorbs water vapour, such as alumina. In operation, when the carbon dioxide adsorbent layer 105 is saturated, the concurrent flow of pressurised container atmosphere through the vessel 1a is stopped and, after venting the vessel 1a to atmosphere, a countercurrent flow of ambient air is initiated through the vessel 1a. This air is both warmer than the refrigerated atmosphere within the container 13, and contains considerably more water vapour than the container atmosphere. The alumina layer 109 serves to remove any water vapour from the countercurrent flow towards the adsorbent layers, thus protecting them from water following regeneration of the ethylene bed. The zeolite layer 105 is regenerated by the pressurised ambient air in a pressure swing-type process, because of the lower partial pressure of carbon dioxide in the pressurised ambient air (as compared to that in the container atmosphere, and within the vessel 1a during the adsorption step). Similarly, the alumina layer 103 is regenerated by the lower partial pressure of water vapour in the pressurised ambient air (the water vapour having been removed therefrom by layer 109). On reversion of a concurrent flow, alumina layer 109 is regenerated by the flow of gas from which water vapour has previously been removed by adsorption in layer 103, any water desorbed from alumina layer 109 being returned to the container.

The vessel 1b contains only 3 adsorbent layers, a first layer 111 which preferentially adsorbs both water vapour and carbon dioxide, such as activated alumina, or an activated alumina/zeolite composite, a second layer 113 which is an ethylene selective adsorbent, such as a zeolite or metal exchanged zeolite, and a final layer 115 of a water adsorbent, such as activated alumina or an activated alumina/zeolite composite. Operation of vessel 1b is much the same as that of vessel 1a, however regeneration of the water/and or dioxide adsorbent layer 111 is more efficient than that of a zeolite layer such as layer 105, so that the layer 111 can be smaller. Also, as with the adsorbent layer 109 in vessel 1a, the layer 115 of activated alumina protects the metal exchanged zeolite layer 113 from the damaging effects of humidity in the ambient air used in the regeneration step.

Figure 3A:
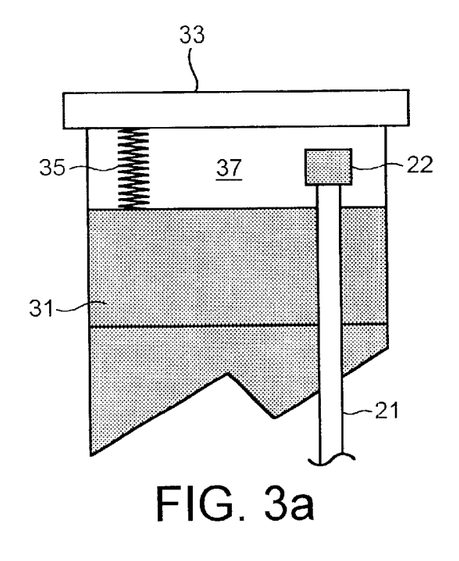
FIGS. 3a and 3b are enlarged schematic cross-sectional views of the opposed ends of the adsorption vessel in FIG. 1.
Figure 3B:
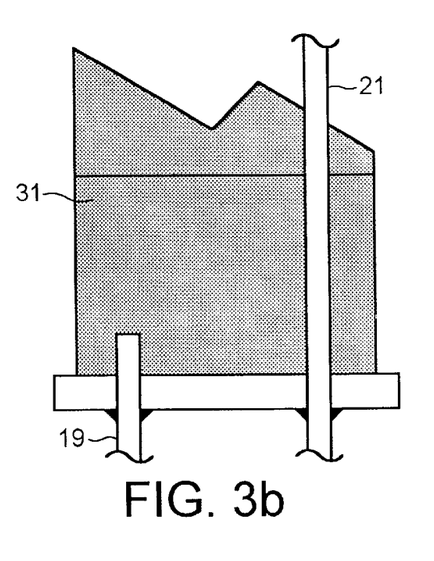

FIGS. 3a and 3b illustrate opposite ends of a suitable adsorbent vessel, such as vessels 1, 1a, 1b in which the adsorbent material 31 is held tightly packed by a compression plate 33 which is urged onto the adsorbent 31 by a spring 35, thus enabling the adsorbent vessel to be used in any orientation without displacement of the adsorbent material 31. As can also be seen, the pipe 19 has an outlet at the lowermost (as shown) end of the adsorbent vessel, emerging into the adsorbent material, and the pipe 21 passes through the adsorbent material and has an outlet 22 at the uppermost end (as shown) of the adsorbent vessel, in the headspace 37 between the wall of the vessel and the compression plate 33, which has perforations (not shown) for the passage of gas therethrough.

Tests were carried out on three different arrangements of adsorbent layers in order to investigate the most efficient arrangement for carbon dioxide removal.

Example A

13X Zeolite, in Between Two Layers of Activated Alumina

Example B

An Activated Alumina/Zeolite Composite

Example C

An Activated Alumina

| Test 1: High $CO_2$ Concentration | |
|---|---|
| Feed flowrate: | 1.7 slpm (standard litres per minute) of nitrogen saturated with water, and containing 10% $CO_2$ and 7% $O_2$ |
| Feed pressure: | 60 psig |
| Regeneration flowrate: | 0.65 slpm of wet air |
| Regeneration pressure: | 5 psig. |
| Cycle tested: | 8 minutes production, 8 minutes regeneration |

After 4 days of testing, the amount of $CO_2$ vented during the regeneration step is less than the amount fed during the cycle. At the same time, the ratio between the maximum and minimum $CO_2$ concentrations during the regeneration step was 1.5 in Example A, as compared with a value of about 5 for Example B, and a value of 3 for Example C. These are indications of the strong interaction between $CO_2$ and the zeolite, that may require not only a pressure swing but a temperature swing for the regeneration. It should also be mentioned that the $CO_2$ adsorption working capacities in Examples A and C are similar, and are about twice the value for Example B.

| Test 2: Low $CO_2$ Concentration | |
|---|---|
| Feed flowrate: | 1.5 slpm of nitrogen saturated with water and containing 1.6% $CO_2$ and 7% $O_2$. |
| Feed pressure: | 60 psig |
| Regeneration flowrate: | 0.65 slpm of wet air |
| Regeneration pressure: | 5 psig. |
| Cycle tested: | 8 minutes production, 8 minutes regeneration |

Under these conditions, all three Examples showed similar levels of $CO_2$ removal. However, in Example A, since it was started with a zeolite saturated with 10% $CO_2$, it took 48 hours to reach cyclic-steady state conditions. No significant breakthrough is observed in any of the cases. At the same time the ratio between the maximum and minimum $CO_2$ concentrations during the regeneration step was 1.3 in Example A, as compared with a value of about 2 for Examples B and C. This again indicates that the pressure swing is not enough to efficiently regenerate the zeolite.

Results also indicate that the amount of nitrogen rejected during the regeneration step is higher in Example A than in Examples B and C. The concentration of oxygen in the vent stream after 1 minute into the regeneration step are, 14, 19 and 17% respectively.

A typical 40 foot (12 m) refrigerated container with a volume of about 66 m³ will, when loaded with produce, have a free volume (i.e. atmosphere) of about 40–45 m³. Whilst the produce respiration rate and optimum container atmosphere composition are dependent on the particular produce, a typical aim for the apparatus would be to remove 10 scfh (0.25 m³/h) of carbon dioxide and completely eliminate the ethylene from a container atmosphere having a carbon dioxide concentration of 10%. Assuming that the adsorption vessel is a cylinder of 15 cm diameter, the adsorbent layers for an efficient three adsorbent layer design (as shown in FIG. 2b, and in the order 111, 113, 115) would comprise:

56 cm of an activated alumina or an activated alumina/zeolite composite 15 cm of an ethylene adsorbent (mixed with inert or alumina/zeolite adsorbent)

15 cm of an activated alumina or an activated alumina/zeolite composite

Figure 4A:
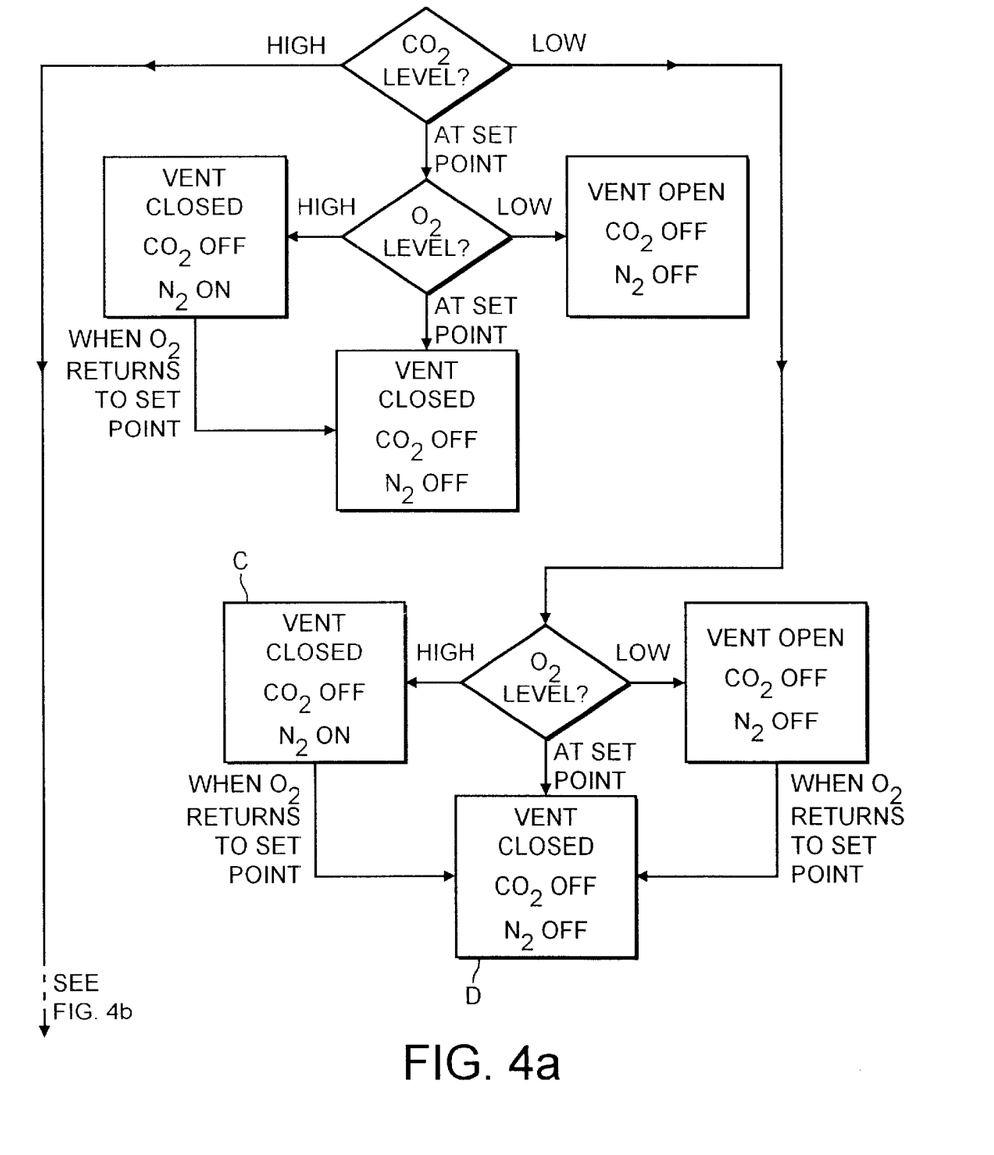
FIGS. 4a and 4b are a flow chart showing the processes by which the apparatus of FIG. 1 is controlled.
Figure 4B:
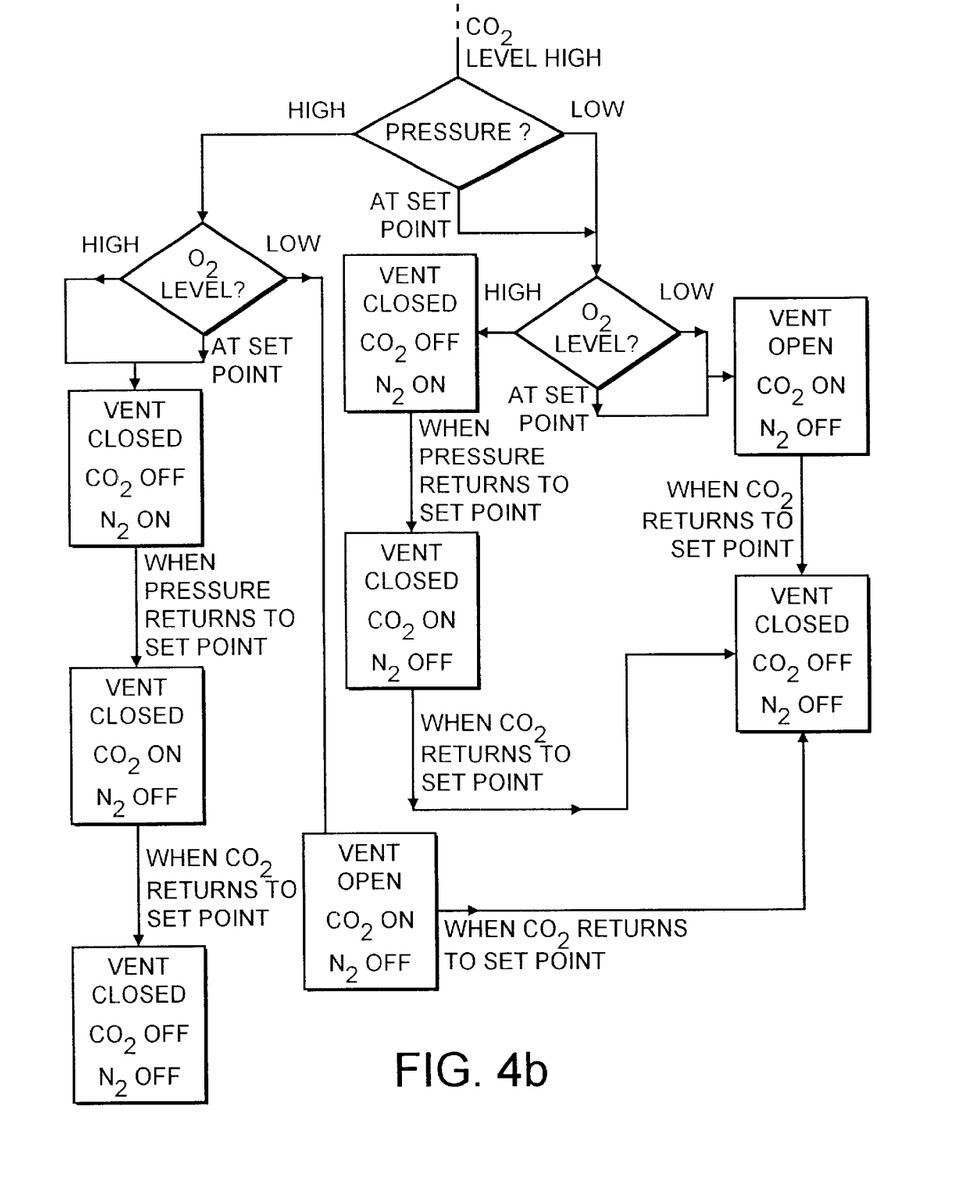

FIG. 4 (FIG. 4a and the continuation on FIG. 4b) illustrates the control regime by which the apparatus of FIG. 1 is controlled in order to maintain a predetermined atmosphere within container 13. The lead signal is that corresponding to the level of carbon dioxide in this atmosphere and depending on whether or not this level is high, low or at a Set Point (set according to the requirements of the produce in the container 13), and on other measurements of the container atmosphere, the carbon dioxide and ethylene adsorption process described above is actuated ("$CO_2$ On" in the the Figure), or the nitrogen injection into the container is actuated ("$N_2$ On" in the Figure), and the vent 45 in the container 13 is opened or closed to vent the container atmosphere to ambient air. In practice the adsorption process and nitrogen injection are never both "On" simultaneously (not least because both are driven by the same compressor 3), and nitrogen is not injected unless the vent 45 is closed. If the sensed carbon dioxide level is low or at the Set Point, the oxygen level is sensed and the adsorption process, nitrogen injection and vent opening effected as illustrated. Optionally, carbon dioxide may be injected into the container atmosphere at points C, D in order to raise the carbon dioxide level within the container 13.

Where the sensed carbon dioxide level in the container atmosphere is high, the pressure within the container is sensed, then the oxygen level, and the adsorption process, nitrogen injection and vent opening effected as illustrated, until the container atmosphere returns to the composition predetermined for the produce in the container.

Figure 5:
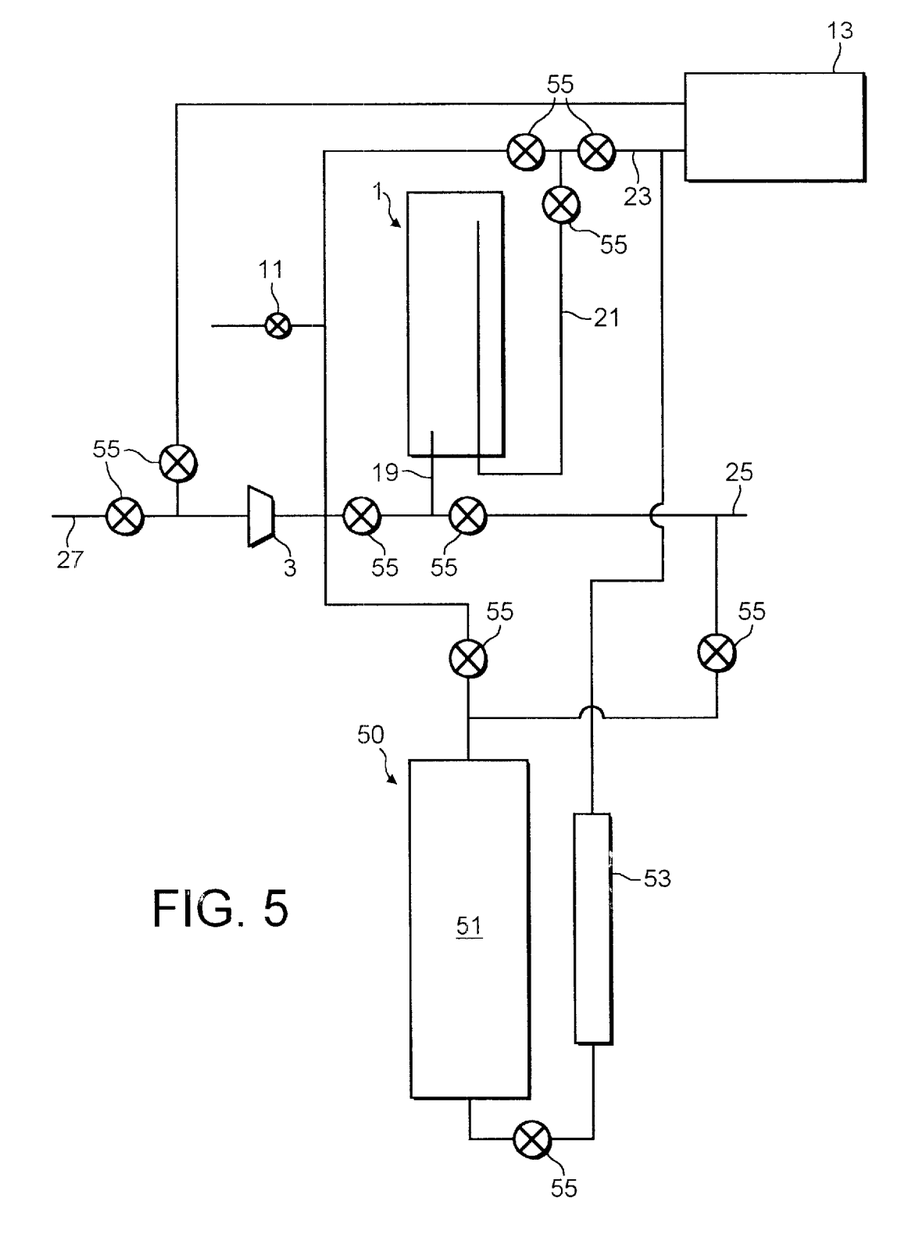
FIGS. 5 and 6 are schematic views of further embodiments of apparatus in accordance with the invention comprising a nitrogen generation system arranged so as to direct nitrogen-rich gas into the container via the carbon dioxide/ethylene adsorption bed.
Figure 6:
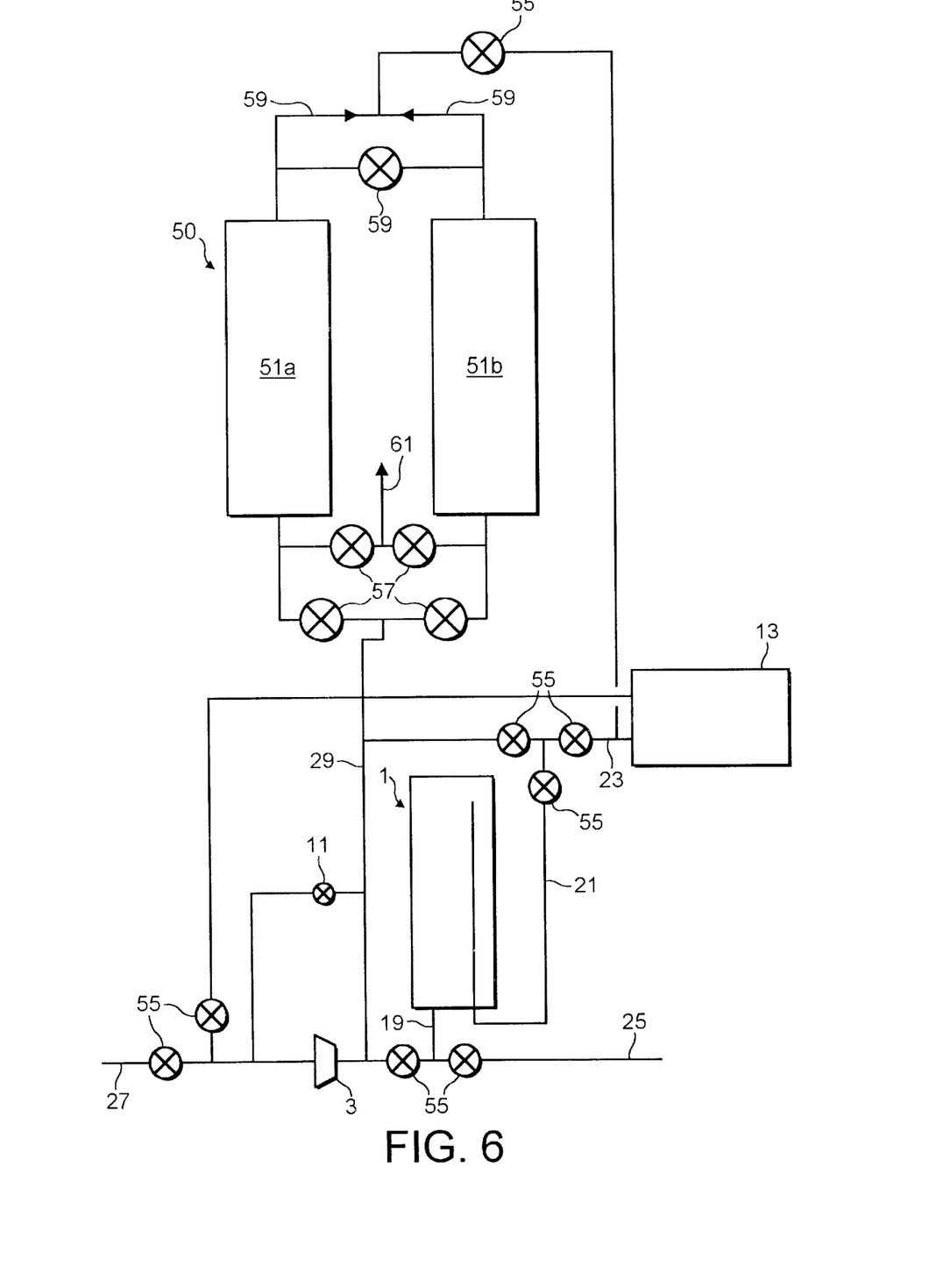

FIGS. 5 and 6 are schematic views of alternative embodiments incorporating single and double bed nitrogen generation systems 50, respectively, arranged so as to direct nitrogen-rich gas into a container 13 via the carbon dioxide and ethylene adsorption vessel 1 (where an element identical to the that shown in FIG. 1 is illustrated in FIGS. 5 and 6, the same reference numeral is used).

The nitrogen generation system 50 of FIG. 5 comprises a single adsorption bed 51 and a buffer vessel 53 for containing nitrogen-rich gas for regenerating the adsorbent material in the bed 51 in a conventional manner. Solenoid valves 55 are disposed in a slightly different arrangement to the valves 5,7,9 shown in FIG. 1 so as to allow cyclic passage of nitrogen-rich gas from the nitrogen generation system 50 though the carbon dioxide and ethylene adsorbent vessel 1 and hence to container 1 in a manner which is readily apparent to those skilled in the art. The advantage of such an arrangement is that it prevents the undesirable introduction of any carbon dioxide and/or ethylene into the container 1 with the nitrogen-rich gas—such as might be caused were the ambient air drawn in through the pipe 27 to be contaminated, as might occur if the ambient air was contaminated by the exhaust from a diesel generator, fumes from a ship's funnel or the like.

FIG. 6 illustrates an arrangement in which the nitrogen and generation system 50 comprises two adsorption beds 51a, 51b arranged via valves 57 and check valves 59 to generate nitrogen-rich gas as is well-known in the art (and to vent to atmosphere through vent 61). Solenoid valves 55 are disposed, somewhat similarly to the arrangement in FIG. 5, so as to direct flows of nitrogen-rich gas to container 1 via carbon dioxide/ethylene adsorption vessel 1 as described above, in a manner readily apparent to those skilled in the art.

We claim:

1. A method of modifying the composition of an atmosphere within a container for perishable and/or respiring produce therein, comprising the steps of:
    a) withdrawing and pressurising a portion of said atmosphere from the container;
    b) adsorbing water vapour from said atmosphere by passing the atmosphere in a first direction through a layer of an adsorbent which adsorbs the water vapour from said atmosphere;
    c) adsorbing carbon dioxide from the atmosphere by passing the atmosphere in the first direction through a layer of an adsorbent which adsorbs carbon dioxide from the atmosphere;
    d) adsorbing ethylene from the atmosphere by passing the atmosphere in the first direction through a layer of an adsorbent which adsorbs ethylene from the atmosphere;
    e) returning the atmosphere to the container; and
    f) regenerating the adsorbent layers by passing ambient air through the adsorbent layers in a direction countercurrent to the first direction and thereafter venting said air to ambient atmosphere, wherein water vapour is adsorbed from said ambient air by passing said air through a layer of an adsorbent which adsorbs the water vapour from said air before it passes through said ethylene and said carbon dioxide adsorbent layers.

2. The method according to claim 1, wherein the adsorption of the water vapour and the carbon dioxide in steps (b) and (c) are in the same layer of adsorbent material.

3. The method according to claim 1, wherein the adsorption steps (b), (c), (d) and (f) are in a single adsorption vessel comprising a plurality of layers of adsorbent.

4. The method according to claim 3, further comprising venting the adsorption vessel to atmosphere between the steps(e) and (f).

5. The method according to claim 1, further comprising, cyclically with the steps (a) through (f), pressurising ambient air and depleting it of water vapour, oxygen, carbon dioxide and ethylene by adsorption thereof, and passing the resulting nitrogen-rich atmosphere into the container.

6. The method according to claim 5, further comprising:
    sensing pressure within the container,
    comparing the pressure sensed to a predetermined pressure, and
    halting the steps of pressurising and depleting of ambient air and of passing nitrogen-rich atmosphere into the container when the pressure sensed is substantially equal to the predetermined pressure.

7. The method according to claim 6, wherein the depletion of water vapour, oxygen, carbon dioxide and ethylene occurs in successive adsorption processes.

8. The method according to claim 1, wherein nitrogen-rich gas is passed into the container via the carbon dioxide and ethylene adsorbent layers.

9. The method according to any claim 8, further comprising:

sensing levels of carbon dioxide, pressure and oxygen within the container, comparing the levels sensed with predetermined levels, the predetermined levels of carbon dioxide end oxygen being determined by the nature of the produce within the container, and initiating and controlling the steps (a) through (f), the passing of nitrogen-rich atmosphere into the container, the injection of carbon dioxide into the container, and/or the venting of the container to ambient atmosphere until the levels sensed are substantially equal to the predetermined levels.

10. The method according to claim 9, wherein the predetermined level of carbon dioxide is between 0 and 12%.

11. The method according to claim 9, wherein the predetermined level of oxygen is between 2 and 12%.

12. The method according to claim 1, further comprising:

sensing a level of relative humidity within the container, comparing the relative humidity sensed with a relative humidity level determined according to the nature of the produce within the container and, when the level sensed is less than the predetermined level, initiating and controlling injection of atomised water into the container until the level sensed is substantially equal to the predetermined level.

13. An apparatus for modifying the composition of atmosphere within a container for perishable and/or respiring produce therein, the apparatus comprising:

means for withdrawing and pressurising a portion of said atmosphere from the container and for introducing the pressurised atmosphere into at least one adsorption vessel for passage therethrough in a first direction, at least one adsorption vessel comprising a plurality of layers of adsorbent material arranged in the first direction and adapted for adsorption of water vapour, carbon dioxide and ethylene;

means for returning the atmosphere to the container;

means for passing pressurised ambient air through the plurality of layers of adsorbent material in the adsorption vessel in a direction countercurrent to the first direction; and a further layer of adsorbent material which adsorbs water vapour being provided directly adjacent a layer of adsorption material which adsorbs ethylene.

14. The apparatus according to claim 13, wherein a single layer of an adsorbent material which adsorbs the water vapour and carbon dioxide is provided adjacent the layer of adsorption material which adsorbs ethylene.

15. The apparatus according to claim 13, wherein the further layer of adsorbent material is interposed between and adjacent the layers of adsorption material which adsorb carbon dioxide and ethylene.

16. The apparatus according clam 13, further comprising:

means for pressurising ambient air and passing the air through adsorption means for removing water vapour, oxygen, carbon dioxide and ethylene from the air, and means for introducing the resulting nitrogen-rich gas mixture from the air into the, container.

17. The apparatus according to claim 16, further comprising:

means to sense levels of carbon dioxide, pressure and oxygen in the atmosphere of the container, and control means to compare the levels sensed against predetermined levels and to actuate the passage of pressurised atmosphere through the adsorption vessel, to actuate the passage of ambient air through the adsorption means, and to vent the container to ambient atmosphere to modify levels of carbon dioxide, pressure and oxygen in the container atmosphere to approach said predetermined levels.

18. The apparatus according to claim 17, further comprising:

means for injecting carbon dioxide into the container.

19. The apparatus according to claim 13, further comprising:

means to sense relative humidity in the atmosphere of the container, and control means to compare the relative humidity sensed with a predetermined relative humidity and to actuate means adapted to inject atomised water into the container atmosphere when the predetermined relative humidity exceeds the relative humidity sensed by a predetermined amount.

* * * * *